US012522265B2

(12) United States Patent
Lindqvist et al.

(10) Patent No.: US 12,522,265 B2
(45) Date of Patent: Jan. 13, 2026

(54) SYSTEM AND METHOD FOR DETERMINING A WEIGHT STATUS OF A RAILWAY VEHICLE

(71) Applicant: Railway Metrics and Dynamics Sweden AB, Stockholm (SE)

(72) Inventors: Jan Lindqvist, Stockholm (SE); Martin Bäfverfeldt, Stockholm (SE)

(73) Assignee: RAILWAY METRICS AND DYNAMICS SWEDEN AB, Stockholm (SE)

( * ) Notice: Subject to any disclaimer, the term of this patent is extended or adjusted under 35 U.S.C. 154(b) by 47 days.

(21) Appl. No.: 18/444,621

(22) Filed: Feb. 16, 2024

(65) Prior Publication Data

US 2024/0278813 A1  Aug. 22, 2024

(30) Foreign Application Priority Data

Feb. 22, 2023 (SE) .................................. 2350203-2

(51) Int. Cl.
*B61L 13/04* (2006.01)
*B61L 15/00* (2006.01)
(Continued)

(52) U.S. Cl.
CPC ............ *B61L 15/0081* (2013.01); *G01G 9/00* (2013.01); *G01G 19/04* (2013.01)

(58) Field of Classification Search
CPC ...... B61L 13/04; B61L 13/042; B61L 13/045; B61L 13/047; B61L 15/0054;
(Continued)

(56) References Cited

U.S. PATENT DOCUMENTS 3,428,139 A * 2/1969 Nolan .................... G01S 15/88
  177/210 R
5,603,556 A * 2/1997 Klink .................. G01G 19/042
  303/22.7
(Continued)

FOREIGN PATENT DOCUMENTS

EP 1600351 A1 11/2005
EP 3822594 A1 5/2021
(Continued)

OTHER PUBLICATIONS

European Search Report from Corresponding European Patent Application No. EP24158136, dated Jul. 3, 2024.
(Continued)

*Primary Examiner* — Erick R Solis
(74) *Attorney, Agent, or Firm* — Ronald M. Kachmarik; Cooper Legal Group LLC (57) ABSTRACT

A system for determining a weight status of a railway vehicle. An emitter to emit radio waves. A first detector arranged on the vehicle to detect radio waves and generate a first distance data set. A second detector arranged on the vehicle to detect radio waves and generate a second distance data set. A third detector arranged on the vehicle to detect radio waves and generate a third distance data set. A fourth detector arranged on the vehicle to detect radio waves and generate a fourth distance data set. The first-fourth distance data set indicate a displacement of the vehicle relative at least one of the rails, the railroad and the ground. The first-fourth detector are arranged at different locations on the vehicle. A processing unit to receive the first-fourth distance data set and determine a weight status of the vehicle based at least on the first-fourth distance data set.

14 Claims, 6 Drawing Sheets

(51) Int. Cl.
*G01G 9/00* (2006.01)
*G01G 19/04* (2006.01)

(58) Field of Classification Search
CPC ............. B61L 15/0058; B61L 15/0072; B61L 15/0081; G01G 9/00; G01G 19/04; G01G 19/042; G01G 19/045; G01G 19/047
USPC .......................................................... 701/19
See application file for complete search history.

(56) References Cited

U.S. PATENT DOCUMENTS

| | | | |
|---|---|---|---|
| 5,735,580 A * | 4/1998 | Klink | G01G 19/042 303/22.7 |
| 2004/0168512 A1 | 9/2004 | McEwan | |
| 2011/0248861 A1 * | 10/2011 | Corrado | G01G 19/08 33/701 |
| 2016/0002865 A1 * | 1/2016 | English | B61K 9/08 105/96 |
| 2017/0169145 A1 | 6/2017 | Ehmke et al. | |
| 2017/0254897 A1 | 9/2017 | Tron et al. | |
| 2019/0250069 A1 | 8/2019 | Samadani et al. | |
| 2020/0079601 A1 * | 3/2020 | Lee | G01G 19/045 |
| 2022/0268913 A1 * | 8/2022 | Nordmeyer | G01S 13/32 |

FOREIGN PATENT DOCUMENTS

| | | |
|---|---|---|
| WO | 9200214 A1 | 1/1992 |
| WO | 2020118373 A1 | 6/2020 |

OTHER PUBLICATIONS

Swedish Office Action from Corresponding Swedish Patent Application No. 2250761-0, dated Jul. 1, 2024.
Swedish Search Report from corresponding Swedish Application No. 2350203-2 dated Sep. 4, 2023, 10 pages.

* cited by examiner

SYSTEM AND METHOD FOR DETERMINING A WEIGHT STATUS OF A RAILWAY VEHICLE

FIELD OF THE INVENTION

The present invention generally relates to a system and method for determining a weight status of a railway vehicle. In particular, the present invention relates to a system and method for determining a weight status of a railway vehicle using radar.

BACKGROUND OF THE INVENTION

Railroads and railway vehicles are under a lot of stress from railway traffic, and it is of high importance to monitor the weight of railway vehicles.

Every railway vehicle, train or carriage is affected by the load (weight) placed on it, for example an uneven load within one carriage may cause uneven wear and tear on the railway vehicle and the railway itself. Further, there are limits on how much weight a railway vehicle or railroad can carry. This limit may be a limit related to structural integrity dictated by the railway vehicle, or a limit set by the railway tracks. Furthermore, it is of interest to more accurately know the weight of a railway vehicle, to evaluate how it is loaded and to better determine the track charges that a train operator needs to pay a rail network.

However, the systems are today not precise enough, especially in situations where the weight needs to be weighed and re-weighed at different locations with different elevations and railroad characteristics.

Thus, it is of interest to improve the way that the weight of the load on a railway vehicle is measured to be able to use the railway vehicle in a suitable manner, to detect problems related to the weight and/or to pay correct track charges. The weight of the railway vehicle may affect the speed of which the vehicle can travel and may also affect the breaking distance. It may also be more prone to accidents and derailment as a result.

Hence, there is a need for an improved system for monitoring the weight status of a railway vehicle.

SUMMARY OF THE INVENTION

It is an object of the present invention to provide a system for determining a weight status of a railway vehicle, in order to detect e.g., a more accurate weight, overloading, uneven loading or lose load, and problems following as a result of this.

It is a further objective to provide a method for determining a weight status of a railway vehicle.

According to a first aspect of the present invention, there is provided a system for determining a weight status of a railway vehicle. The system comprises at least one emitter configured to emit radio waves, a first detector arranged on the railway vehicle, configured to detect radio waves and generate a first distance data set, a second detector arranged on the railway vehicle, configured to detect radio waves and generate a second distance data set, a third detector arranged on the railway vehicle, configured to detect radio waves and generate a third distance data set, a fourth detector arranged on the railway vehicle, configured to detect radio waves and generate a fourth distance data set. The first, second, third and fourth detector are arranged at different locations on the railway vehicle. The system further comprises a processing unit configured to receive the first, second, third and fourth distance data set, and determine a weight status of the railway vehicle based at least on the first, second, third and fourth distance data set.

According to a second aspect of the present invention, there is provided a method for determining a weight status of a railway vehicle. The method comprises emitting radio waves by at least one emitter and detecting at least a portion of reflected radio waves by a first, second, third and fourth detector arranged at a respective first, second, third and fourth position on the railway vehicle. The method further comprises generating a first, second, third and fourth distance data set for each respective detector and determining a weight status based on at least the first, second, third and fourth distance data set by a processing unit.

Thus, the first and second aspect of the present invention are based on the common concept or idea of providing a more reliable and accurate system and method for determining the weight status of (a) railway vehicle(s), so that the weight status of railway vehicle(s) may be monitored and problems relating to weight can be avoided. The weight status is determined based on the displacement of the railway vehicle relative the ground, the railroad, and/or the rails. The displacement is primarily the vertical displacement. The displacement is determined by the system by emitting radio waves from at least one emitter, and detecting corresponding reflected/echoing radar waves by at least four detectors arranged at different locations. Hence, the displacement of the railway vehicle may be determined at four locations at least, which allows a weight status of the railway vehicle to be determined based on four distance data sets originating from four different detectors arranged at different locations. By having at least four detectors arranged at different locations on the railway vehicle, and generating four different distance data sets, one may determine a weight status in a more precise and informative manner.

A railway vehicle may be understood as one carriage (wagon), a set of carriages (wagons) or any part of a locomotive/train. The railway vehicle may be of different wagon-types, and have different running gear. By running gear it is here meant components of a railway vehicle that run passively on the rails, unlike those of the driving gear. The running gear 135 may comprise the wheels, axles, axle boxes, suspension, springs and vehicle/bogie frame of a railway vehicle. For example, the system may comprise one or more running gears, wherein the running gear comprises a bogie frame with two wheelsets. A railway vehicle may have different running gears, such as a single axle-bogie or Jakobs bogie. The bogie may be a Y25 bogie. Further a railway vehicle may be understood as a train used to transport passengers or goods. Railway vehicle and train may be used interchangeably in the present application.

A distance data set may be understood as a data set comprising data of the received radio waves indicating a distance travelled by the radio wave which in turn indicates a displacement of the railway vehicle. The distance data sets may indicate a displacement of the railway vehicle relative the rails/railroad/ground. Preferably the displacement of the railway vehicle is relative the rails, since it provides a more consistent surface to reflect radio waves against. The displacement may be due to a displacement between the railway vehicle and the rails provided by a suspension of the railway vehicle. Further, the distance data set may comprise information of the distance the radio waves emitted from the emitter have travelled before reaching the detector and/or a point in time at which the radio waves were detected. For example, the time of flight (TOFL) may be included in the distance data set. The processing unit configured to receive the first, second, third and fourth distance data set may be located on the railway vehicle. The distance data set(s) may be received by the processing unit by wire, or wirelessly by a transceiver. The processing unit may be located away from the railway vehicle, i.e., separate from the railway vehicle, and the distance data sets may be received wirelessly. The processing unit may be configured to receive distance data set from more than one railway vehicle. In other words, one processing unit may be configured to receive distance data sets from the detectors arranged on one carriage of a train, or arranged on a plurality of carriages.

The system according to the first aspect of the present invention comprises at least one emitter, wherein the emitter is arranged on the train. By the phrasing "arranged on the train", it is here meant mounting, attaching, fixing and/or securing the at least one radar unit to the train, for example to a wagon and/or bogie of the train. For example, each railway vehicle may have one emitter configured to generate detector data for all detectors, or each railway vehicle may have more than one emitter positioned and configured to generate detector data for a subsection of the detectors. The emitter may be any device, component or unit which can generate electromagnetic radiation with a wavelength in the radio spectrum. The radio waves being emitted may have a frequency in the range of 3 Hz-3000 GHz.

The system further comprises a first, second, third and fourth detector, configured to detect at least a portion of the radio waves reflected from the rails and/or ground and generate detector data. The detector may be any device, component or unit that can receive/detect electromagnetic radiation in the radio spectrum, e.g., radio wave echoes. The detectors are arranged at different locations on the railway vehicle. In other words, the at least four detectors are arranged/mounted on the railway vehicle at a location where it may generate at least four different distance data sets. For example, the detectors may be placed underneath the railway vehicle. In a more specific example, the detectors may be placed at/on the running gear, e.g. on a bogie, and arranged to receive radio waves reflected from the rails.

The present invention is advantageous in that it uses electromagnetic radiation in the radio-spectrum. Radio waves are beneficial to use because they can penetrate for example dirt on the rails, the railway vehicle or the radar unit(s) itself without losing much information, e.g., spectral information. This provides a system with higher fidelity and accuracy, usable in realistic scenarios where the presence of dirt, or other obstructions, is common, without losing information, due to e.g., attenuation. Furthermore, by using radio waves, the system may be more robust and may be cheaper than options such as LIDAR and ultrasound, due to e.g., more robust and/or cheaper components.

It will be further appreciated that the use of four separate detectors, at four respective positions on the railway vehicle will provide local values giving the possibility to detect and thus prevent uneven loading and the like. In addition, using at least four detectors arranged at different respective positions will provide a better and more accurate weight approximation than could be achieved with a single detector. In a preferable embodiment, the detectors are arranged at the wheels/wheelset(s) of railway vehicle. In an even preferable embodiment, the detectors are arranged such that at least one detector is arranged at each wheel/wheelset in order to generate displacement information, and subsequently weight status/information at each wheel/wheelset location, which provides a more accurately determined weight status.

It will be further appreciated that the system is arranged on the railway vehicle, allowing the system to determine a weight status of the railway vehicle at any point in time, both when the railway vehicle is moving, and when the railway vehicle is parked. This may provide, at least to some extent, real-time information gathering on a weight status of railway vehicle.

The system is configured to determine a weight status at least partially based on the generated detector data, wherein the weight status contains information on a weight of the railway vehicle. The weight status may comprise at least part of the detector data. The weight status may comprise information about the railway vehicle's displacement in relation to the rails and thus, the weight status may comprise information/data about the total weight of the railway vehicle and/or the weight distribution over the railway vehicle as well as local weight and/or changes in weight or weight distribution over time, calculated from the detected data.

By continuous and/or intermittent measurements and monitoring of the weight status of the railway vehicle future problems may be avoided. For example, during operation a change in weight status, may indicate that a load has moved, or been dropped, while a weight status, may indicate that something is at fault.

According to an embodiment of the present invention, the railway vehicle comprises a first bogie comprising a first set of wheels, wherein the first detector is arranged on the first bogie at a first position, and the second detector is arranged on the first bogie at a second position different from the first position, a second bogie comprising a second set of wheels, wherein the third detector is arranged on the second bogie at a third position, and the fourth detector is arranged on the second bogie at a fourth position different from the third position.

Bogie (wheel truck, truck) refer to a chassis or framework underneath a railway vehicle that carries a wheelset and may also be referred to as running gear. It comprises at least one wheelset but may comprise two or more wheelsets. The bogie may be placed underneath one carriage, or underneath and between two carriages (Jacobs bogie).

The present embodiment is advantageous in that the positioning of the detectors at many types of bogies, comprising the wheel sets, provides more accurate determination of the weight status. Since, the displacement is the highest at the bogies, i.e. it will be the most affected part of the railway vehicle by a change in weight status. Note that this depends on the wagon type and the running gear, i.e. this may not be true for all bogie-types. For example, the bogie may be the part of the railway vehicle that is most affected by uneven load or too large of a load. Furthermore, positioning the detectors on the bogies will give a preferred spread of the positioning of the detectors and may be easily recreated if removable detectors are used.

According to an embodiment of the present invention, the system comprises a first emitter, a second emitter, a third emitter and a fourth emitter, wherein the first, second, third and fourth emitter are arranged adjacent the first, second, third and fourth detector respectively. In other words, a first number of emitters and a second number of detectors may be arranged in pairs arranged adjacent to/next to/in the vicinity of each other, consisting of an emitter and a detector, wherein the first number and the second number may be the same.

The present embodiment is advantageous in that the data distance data sets may comprise data of better quality, possibly resulting in a better weight status determination/estimation. Furthermore, the process of generating the distance data sets and/or determining the weight status may be less complex when a first emitter and a corresponding detector configured to detect the radio waves emitted by the first emitter are arranged adjacently, i.e. in the vicinity or in close proximity of each other. Due to the nature of radio waves and that they are measured at a relatively short distance, i.e. between the train and the rails, it is easier/better to have the detector and emitter arranged at approximately the same position.

According to an embodiment of the present invention, the first emitter and the first detector forms a first radar unit, wherein the second emitter and the second detector forms a second radar unit, wherein the third emitter and the third detector forms a third radar unit and wherein the fourth emitter and the fourth detector forms a fourth radar unit. In other words, the emitters and detectors may form a plurality of radar units, wherein each radar unit comprises an emitter and a detector. Hence, the system may comprise one or more radar units comprising an emitter and a detector, configured to emit and detect radio waves. A radar unit may comprise a single unit, i.e. a detector and a emitter may constitute a single piece/device/unit. The present embodiment is advantageous in that it further improves data quality of the distance data sets and reduces complexity in the determination of the distance data sets and/or determination of the weight status.

The detectors, emitters and/or radar units may be removably attached to the railway vehicle. This could be done by magnets. The possibility to have the detectors, the emitter(s) and/or the radar unit removably attached to the vehicle will provide a dynamic system that is easily adaptable and adjustable depending on specific needs.

In another alternative embodiment, the railway vehicle comprises a first emitter arranged on the first bogie, and a second emitter arranged on the second bogie, wherein the first and second detector are configured to detect radio waves from the first emitter, and the third and fourth detector are configured to detect radio waves from the second emitter. The present embodiment is advantageous in that a first emitter may be arranged near the first and second detector, and a second emitter may be arranged near the third and fourth detector. Hence, improved detector data may be provided, e.g. a better resolution may be achieved. Furthermore, the energy requirement for a specific emitter may be lower since it may send radio waves of lower energy that will still be detected by a detector, due to the possibility of being able to place a first emitter closer to detectors on a first bogie, and a second emitter closer to detectors on a second bogie. This is further improved by the fact that radio waves are used, which may lose less energy when passing through obstacles/dirt.

According to an embodiment of the present invention, the railway vehicle comprises a first suspension unit for the first bogie, and a second suspension unit for the second bogie, wherein the first, second, third and fourth detector are arranged on a suspended part of the railway vehicle, and wherein the processing unit is configured to determine the weight status at least partially based on a suspension-displacement. In other words, the detectors are arranged, such that the displacement relative the railway/railroad ground caused by movement in the suspension unit is included in the distance data sets. The weight status may be determined by the processing unit at least partly based on the displacement between the suspended part and a non-suspended part of the railway vehicle. Hence, the suspension-displacement may be the displacement relative the rails provided by the suspension unit and/or the displacement between the suspended part and a non-suspended part. The suspension units may comprise one or more springs. The processing unit may be configured to determine the weight status based at least partly on the spring constant of the one or more springs. In an embodiment of the present invention, wherein the system comprises radar units, comprising a detector and an emitter, the radar units may be arranged on the suspended part. Hence, the displacement relative the railway/railroad ground caused by movement in the suspension unit may be included in the distance data sets.

The suspension unit may comprise a normal spring damper system which supports the structural suspension of the carriage and entire train. These spring damper systems may be present in every bogie. The suspension unit may provide suspension between the bogie/bogie-frame and body of the railway vehicle containing the load, and/or between the bogie frame and axle-boxes. The load may comprise goods being transported by the railway vehicle. The suspended part of the railway vehicle may be the wheels and/or the bogie which the wheels are attached to.

According to an embodiment of the present invention, the processing unit is configured to determine the weight status also based on at least one suspension metric of the first and/or second suspension. The suspension metric may be related to the force exerted by the suspension unit, e.g., one or more springs comprised in the suspension unit. The suspension metric may comprise a spring constant of one or more springs comprised in the suspension unit. In other words, the suspension metric may indicate a status/condition of the suspension unit. Furthermore, the suspension metric may comprise suspension chart data, indicating a relationship between load and suspension-displacement of a suspension unit. The suspension metric may change over time, as a result of use. Hence, the displacement provided by the suspension unit(s) may vary over time. For example, a high weight/load on the railway vehicle and a high force exerted by the suspension unit may result in the same displacement as a low weight/load on the railway vehicle and low force exerted by the suspension unit. As an example, the suspension unit may comprise a spring dampening unit, wherein the spring loses tension over time and exerts less and less force when it is worn down, and it is beneficial to adjust the determination of the weight status based on this change in suspension. This embodiment is beneficial as it may provide a more accurate weight status, especially over time.

According to an embodiment of the present invention the first and second detector are arranged on opposite sides of the first bogie and along the center line extending in the width or longitudinal direction of the first bogie, and the third and fourth detector are arranged on opposite sides of the second bogie and along the center line extending in the width or longitudinal direction of the second bogie. The present embodiment is advantageous in that the detectors are positioned in a way which allows for easier and more accurate determination of the weight status. By placing detectors symmetrically on the bogie, and/or relative the wheels, the calculations required to calculate a weight status may be simplified.

According to an embodiment of the present invention, the weight status comprises an approximated weight of the railway vehicle. The present embodiment is advantageous in that it provides a system which gives an actual numerical value for the weight/load on the railway vehicle. The improved approximated weight provided by the system may be used for paying a more correct sum of track charge to a railroad network and/or prevent overloading of railway vehicle and track.

According to an embodiment of the present invention, the weight status comprises a weight distribution in a horizontal plane of the railway vehicle, wherein the first, second, third and fourth detector are arranged in said horizontal plane. By placing the detectors in the same horizontal plane of the railway vehicle, the calculation/determination of the weight status may be improved and/or simplified.

According to an embodiment of the present invention, the railway vehicle further comprises a fifth, sixth, seventh and eight detectors, wherein the fifth and sixth detector are arranged on opposite sides of the first bogie and along a center line extending in the longitudinal direction of the first bogie, and wherein the seventh and eight detectors are arranged on opposite sides of the second bogie and along a center line extending in the longitudinal direction of the second bogie.

The additional fifth, sixth, seventh and eight detectors will provide more distance data sets, and thus more local values. The present embodiment is further advantageous in that the resolution may increase, providing more accurate determining of the weight status of railway vehicle. Hence, a better weight distribution may be determined and/or a more accurate weight.

According to an embodiment of the present invention, the system comprises at least one of an accelerometer and a gyroscope configured to generate a directional data set, and wherein the weight status is also based on the directional data set. The present embodiment is advantageous in that the weight status may be determined even more accurately. This is because the accelerometer and/or the gyroscope may provide information on e.g., tilting and/or accelerations of the railway vehicle which impacts the displacement of the railway vehicle relative the rails/ground/railroad.

According to an embodiment of the present invention, the system comprises a temperature sensor configured to generate a temperature data set, and wherein the weight status is also based on the temperature data set. The temperature may affect different parts of the railway vehicle that in turn has an effect on the displacement shown in the distance data sets. For example, different parts may expand/shrink due to temperature fluctuations, and/or a suspension unit may be affected. Hence, the present embodiment is advantageous in that it increases accuracy of the weight measurements. In a more specific embodiment, the temperature sensor may be configured to measure an ambient temperature and generate an ambient temperature data set, and wherein the weight status is also based on the temperature data set. Furthermore, the temperature sensor may be configured to measure a temperature of a part of the running gear, wherein the temperature data set comprises temperature data indicating a temperature of a part of the running gear, such that e.g. a hot box may be detected and accounted for when determining the weight status, due to its effect on the displacement of the railway vehicle relative the rails.

According to an embodiment of the present invention, the weight status may be determined by using machine learning methods. For example, a machine learning model is provided with the detector data, i.e. the distance data sets, as input, and it outputs the weight status. The determining/calculation of the weight status may comprise providing a metric representing the weight status of the railway vehicle in terms of weight distribution or local values. The weight status of the railway vehicle may be calculated directly or indirectly from the detector data, and may be combined with other data sets collected by sensors included in the system, such as a directional data set from an accelerometer/gyroscope and/or a temperature data set from a temperature sensor. The present embodiment is advantageous in that the weight status may be determined more efficiently and accurately.

According to an embodiment of the second aspect of the present invention, the method further comprises determining a friction metric by generating a first set of the first, second, third and fourth distance data set during operation of the railway vehicle at a first time, and a second set of the first, second, third and fourth distance data set during operation of the railway vehicle at a second time different from the first time, and subsequently determine the friction metric based on the first and second set, wherein the determining of the weight status is also based on the friction metric. Hence, the weight status may be based on a suspension of a suspension unit of the railway vehicle as well as a friction metric, indicative of the friction of two parts affecting the displacement of the railway vehicle relative the rails. The friction metric may indicate a friction between an axle box of the running gear of the railway vehicle and another part of the running gear that affects the displacement of the railway vehicle relative the rails, provided by primarily a suspension unit.

BRIEF DESCRIPTION OF THE DRAWINGS

This and other aspects of the present invention will now be described in more detail, with reference to the appended drawings showing embodiments of the invention.

DETAILED DESCRIPTION

As illustrated in the figures, the size of elements and regions may be exaggerated for illustrative purposes and, thus, are provided to illustrate the general structures of the embodiments. Like reference numerals refer to like elements throughout.

Exemplifying embodiments will now be described more fully hereinafter with reference to the accompanying drawings, in which some embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1A:
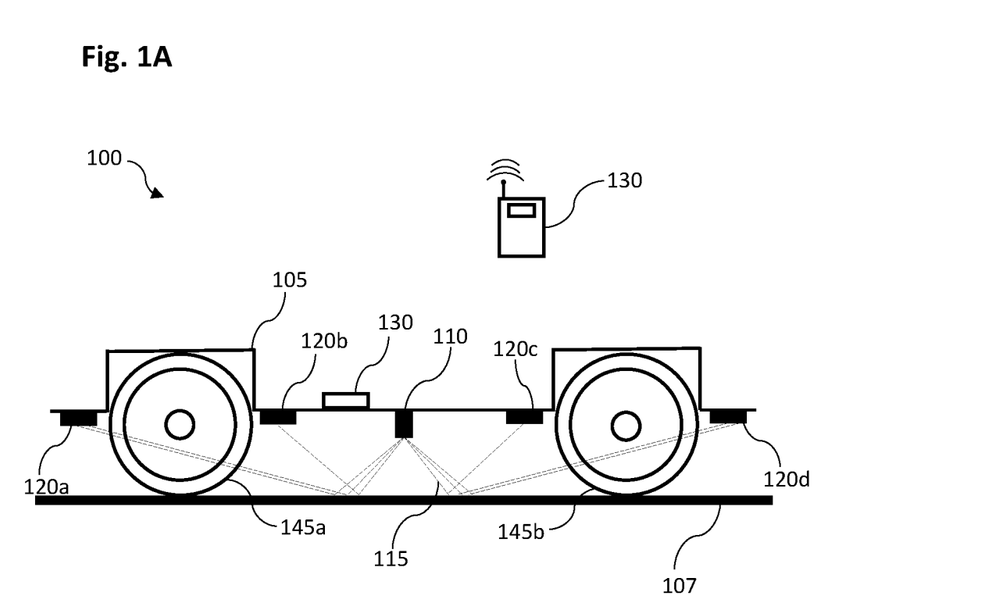
FIG. 1A-B schematically illustrate systems in accordance with embodiments of the present invention.

FIG. 1A schematically illustrates a system 100 for determining a weight status of a railway vehicle 105, as viewed from a side of the railway vehicle 105. The railway vehicle 105 may be any type of railway vehicle. The system 100 comprises an emitter 110 configured to emit radio waves 115. The emitter 110 is arranged underneath the railway vehicle. The system 100 comprises a first detector 120a, a second detector 120b, a third detector 120c and a fourth detector 120c. It may be beneficial to position the emitter 110 such that the signal strength reaching the detectors 120 is approximately equal, e.g., by positioning the emitter 110 in the center of the railway vehicle 105 and/or the detectors (120a, 120b, 120c, 120c). The emitter 110 may be removably attached to the railway vehicle 105, e.g., by magnets or other corresponding fastening means enabling a dynamic and adaptable system 100. The emitter 110 may be arranged so that the radio waves 115 are directed towards the detectors 120. The radio waves 115 emitted by the emitter 110 will be reflected against the rails 107 and/or the ground. The reflected radio waves 115 will be detected by the detectors 120. The system comprises a total of at least four detectors (120a, 120b, 120c, 120d) arranged at four different positions of the railway vehicle 105. The detectors 120 may be fixedly attached to the railway vehicle 105. The detectors 120 may be removably attached to the railway vehicle 105, e.g., by magnets or corresponding fastening means enabling a dynamic and adaptable system. Different positions of the detectors 120 may provide different information. The detectors 120 are configured to generate a respective distance data set. The distance data sets are used to determine a weight status of the railway vehicle 105. This is determined by a processing unit 130. The detectors 120 may comprise respective processing circuitry, configured to receive detected radio waves 115 and perform operations and/or calculations and generate a distance data set. Each detector 120 may comprise a wireless transmitter configured to transmit/send the distance data set, e.g. to the processing unit 130. The distance data set may comprise raw detector data and/or data computed from the raw detector data by the processing circuitry comprised in the detectors 120. The distance data sets may be transmitted/sent to the processing unit 130. The processing unit 130 may be part of a computer, and/or central server arranged on the railway vehicle 105 and/or off the railway vehicle 105.

The emitter 110 may comprise a wireless transmitter configured to transmit/send wave information of the emitted radio waves 115, wherein the transmitted wave information may be used to determine the weight status. The wave information may be transmitted/sent to the processing unit 130. The emitter 110 may comprise a receiver configured to receive instructions, e.g. from the processing unit 130 or any control unit.

In FIG. 1A, the processing unit 130 is arranged on the underside of the railway vehicle 105, receives the distance data sets from the detectors 120. The processing unit 130 may receive the distance data sets by wire/cable, or wirelessly. It may have alternative positions, such as inside the railway vehicle 105, or not located on the railway vehicle 105 at all, e.g., at a control center or the like. The processing unit 130 may be part of a central computer. The processing unit 130 determines a weight status of the railway vehicle 105 based on the received distance data sets.

Figure 1B:
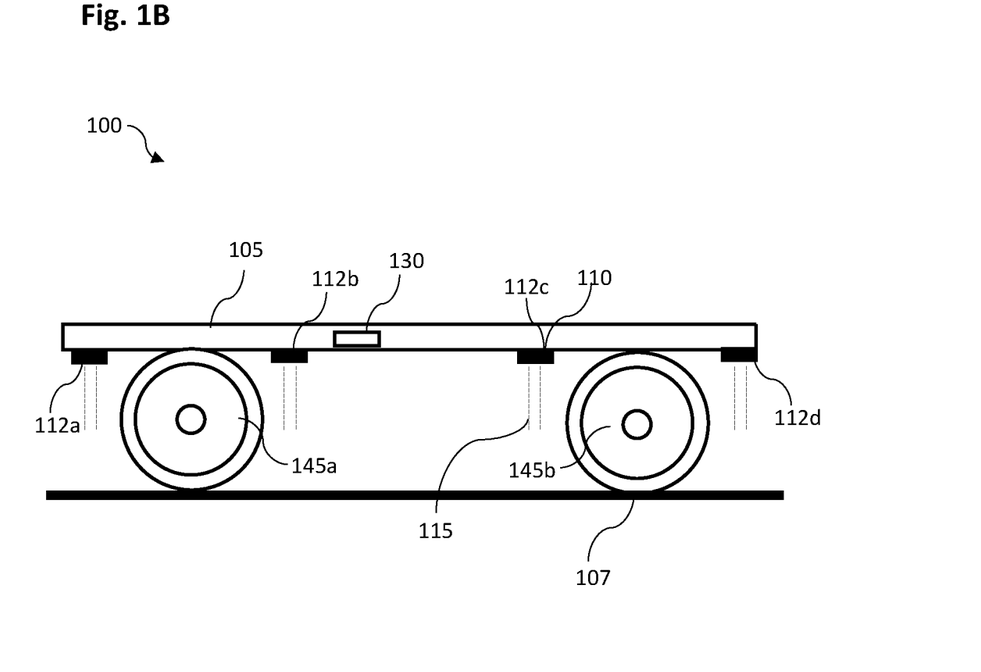

FIG. 1B schematically illustrates a system 100 for determining a weight status of a railway vehicle 105. It should be noted that the system 100 shown in FIG. 1B has several features in common with the system 100 shown in FIG. 1A, and it is hereby referred to FIG. 1A and the associated text for an increased understanding of some of the features and/or functions of the system 100.

In FIG. 1B the system 100 comprises four radar units 112. Each radar unit 112 comprises a detector 120 and an emitter 110. Each radar unit 112 may form a single unit comprising a detector 120 and an emitter 110. A first radar unit 112a and A second radar unit 112b are arranged at a first set of wheels 145a. A third radar unit 112c and A fourth radar unit 112d are arranged at a second set of wheels 145b. The radar units 112 are configured to generate a respective distance data set. The system 100 comprises a processing unit 130 configured to receive the distance data sets from the radar units 112 and determine a weight status of the railway vehicle 105 based at least on the first, second, third and fourth distance data set.

FIG. 2A-G schematically illustrates different embodiments and implementations of the system 100 according to the present invention. FIG. 2A-G schematically illustrates a system 100 comprising at least one emitter 110 arranged on the underside of a railway vehicle 105. The emitter 110 is configured to emit radio waves. Further, a first 120a, a second 120b, a third 120c and a fourth detector 120d are depicted arranged/positioned pairwise next to a respective wheelset 145a. The detectors 120 may be mounted on the railway vehicle 105, e.g., in a fixated manner, and/or they may be removably attached to the railway vehicle 105. The emitter 110 may preferably be placed so that the signal is similar in strength for all detectors 120, but it is possible to place it anywhere in relation to the detectors 120. Each detector 120 may be positioned on the underside of the railway vehicle 105 such that the signal emitted from the emitter 110 can reach it. While not depicted, the detectors 120 does not need to be positioned in close proximity to the wheelsets 145 and may be positioned anywhere on the underside of the railway vehicle. Preferably, the detectors 120 are positioned in a scattered manner so that the detected values generated by the detectors 120 may provide a better view/picture/idea of the weight status of the whole railway vehicle 105. In FIG. 2A-G, it is to be understood that each detector 120 may have a corresponding emitter 110 arranged at the same location. For example, the system 100 may comprise four or more radar units 112 arranged at the positions of the detectors 120 indicated in the figures and the associated texts, wherein the radar units 112 comprises a detector 120 and an emitter 110 forming a single unit.

It is to be understood that the system may comprise one or more emitters 110 and four or more detectors 120 respectively. For example, a first emitter 110 may be configured to emit radio waves to be detected by a first and second detector 120 and a second emitter 110 may be configured to emit radio waves to be detected by a third and fourth detector 120. In another example each detector 120 has their own emitter 110 configured to emit radio waves for that specific detector 110.

It should be noted that the systems 100 shown in FIG. 2A-2G has several features in common, and it is hereby referred to FIG. 2A-2G and the associated texts for an increased understanding of some of the features when reading the respective texts for FIG. 2A-2G.

Figure 2A:
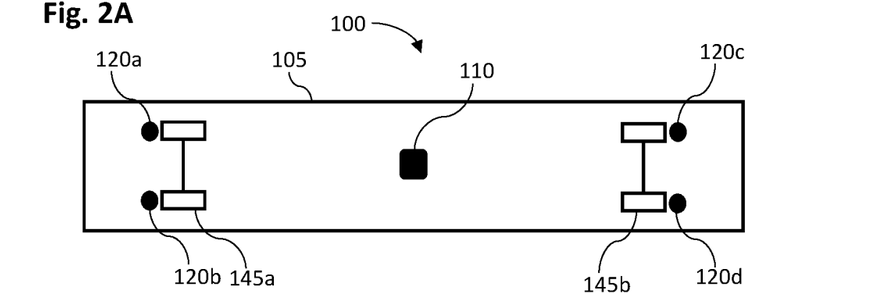
FIG. 2A-G schematically illustrate systems in accordance with embodiments of the present invention.

In FIG. 2A, the detectors 120a and 120b are arranged at a first set of wheels 145a, wherein detector 120a is arranged on a first side of the first set of wheels 145a and the detector 120b is arranged on a second side opposite the first side of the first set of wheels 145a. Similarly, the detectors 120c and 120d are arranged at a second set of wheels 145b. It is to be understood that the set of wheels 145a and 145b in FIG. 2A may be arranged on a framework/structure that can be called a bogie. It is also to be understood that the bogies 140, i.e. 140a and 140b, may comprise multiple sets of wheels 145 respectively. For example, each bogie 140 may comprise four or six sets of wheels 145.

Figure 2B:
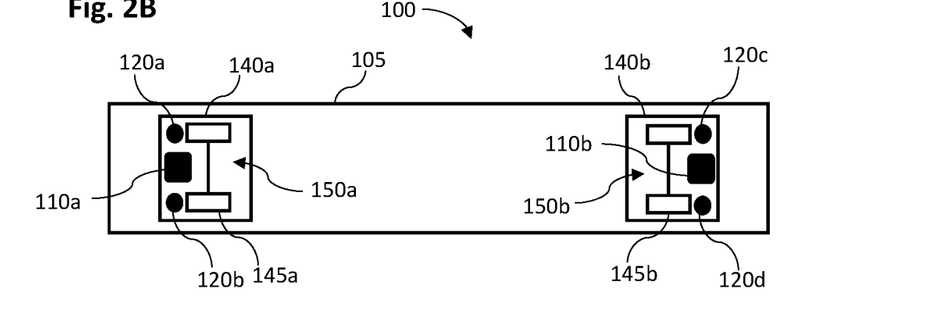

In FIG. 2B, the system 100 comprises two emitters 110, a first emitter 110a positioned/arranged on the first bogie 140a and a second emitter 110b positioned/arranged on the second bogie 140b. The detectors 120a and 120b are arranged on a first bogie 140a, and the detectors 120c and 120d are arranged on a second bogie 140b. It is to be understood that the first emitter 110a, positioned on the first bogie 140a, is configured to emit radio waves to be detected by the detector 120a and 120b and that the second emitter 110b, arranged on the second bogie 140b is configured to emit radio waves to be detected by the detectors 120c and 120d. The emitter 110a is arranged adjacent/next/in close proximity to the first and second detector 120a, 120b. In FIG. 2B, the railway vehicle comprises a first suspension unit 150a for the first bogie 140a, and a second suspension unit 140b for the second bogie 140b. The system 100 is configured to determine a weight status from the suspension-displacement, i.e. the displacement due to the suspension. The detectors 120 are arranged on a suspended part of their respective bogie 140a, 140b, such that the generated distance data sets comprises distance data indicating the suspension-displacement.

The railway vehicle 105 comprises a suspension unit 150a for the first bogie 140a and a second suspension unit 150b for the second bogies 140b. The detectors 120 may be arranged on the suspended part of the railway vehicle 105, such that the displacement due to the suspension can be detected, e.g. in the flight time of the radio waves.

In an example, the detectors 120 are arranged on a part of the railway vehicle 105, such that when the railway vehicle 105 moves vertically via the suspension 150, there will be a vertical displacement the railway vehicle 105 and the rails/railroad/ground, which translates to a difference in distance traveled of the radio waves emitted by the emitter 110 and received by the detectors 120, that may be used to determine the weight status of the railway vehicle 105.

Figure 2C:
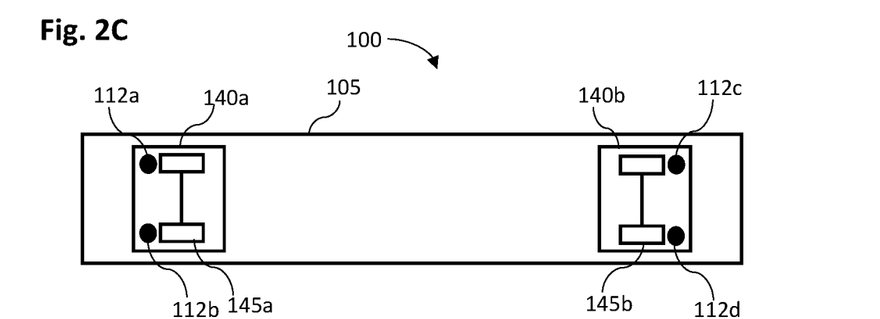

FIG. 2C schematically illustrates a system 100 similar to the one showed in FIG. 2A-B, wherein the system 100 comprises four radar units 112, wherein each radar unit 112 comprises a detector 120 and an emitter 110. The radar unit 112 may be any kind of unit that can emit and detect radio waves, such as a radio-wave transceiver. The system 100 comprises a first radar unit 112a and a second radar unit 112b arranged on the first bogie 140a. The system 100 comprises a third radar unit 112c and a fourth radar unit 112d arranged on the second bogie 140b.

Figure 2D:
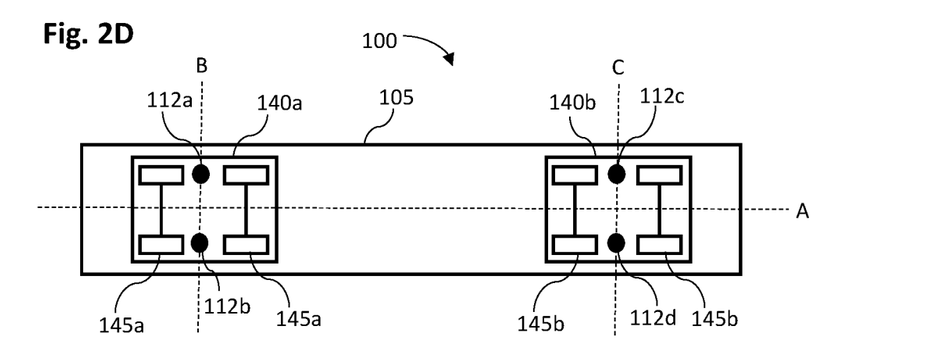

FIG. 2D schematically illustrates a system 100 similar to the one showed in FIG. 2A-2C, wherein the railway vehicle 105 comprises two bogies 140a and 140b, wherein each bogie 140a, 140b comprises two set of wheels 145a and 145b respectively. In FIG. 2D, the system 100 comprises four radar units 112 arranged on the two bogies 140a, 140b. The system 100 comprises a first radar unit 112a and a second radar unit 112b arranged on the first bogie 140a. The system 100 comprises a third radar unit 112c and a fourth radar unit 112d arranged on the second bogie 140b. The first and second radar units 112a, 112b are arranged along a center line B extending in the width direction of the first bogie 140a through the center of the first bogie 140a, and on opposite sides of a center line A extending in the longitudinal direction of the first bogie 140a. The third and fourth radar units 112c, 112d are arranged along a center line C extending in the width direction of the second bogie 140b through the center of the second bogie 140b, on opposite sides of the center line A.

Figure 2E:
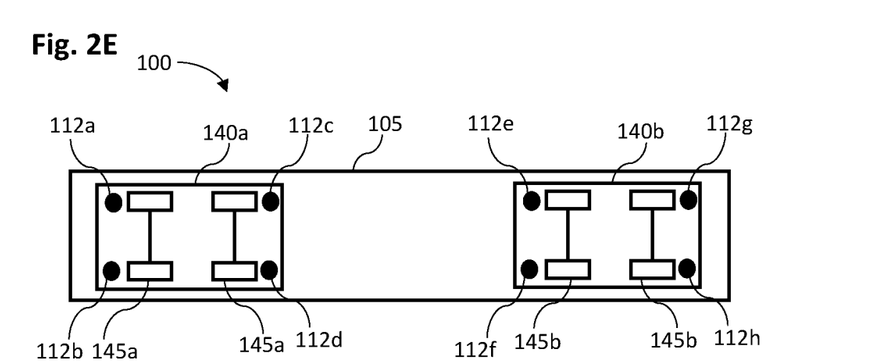

FIG. 2E schematically illustrates a system 100 similar to the one showed in FIG. 2D, wherein the railway vehicle 105 comprises two bogies 140a and 140b, wherein each bogie 140a,140b comprises two sets of wheels 145a and 145b respectively. In FIG. 2D, the system 100 comprises eight radar units 112a-112h. The system 100 comprises four radar units 112a-112d arranged on the first bogie 140a. The system 100 comprises four radar units 112e-112h arranged on the second bogie 140b.

Figure 2F:
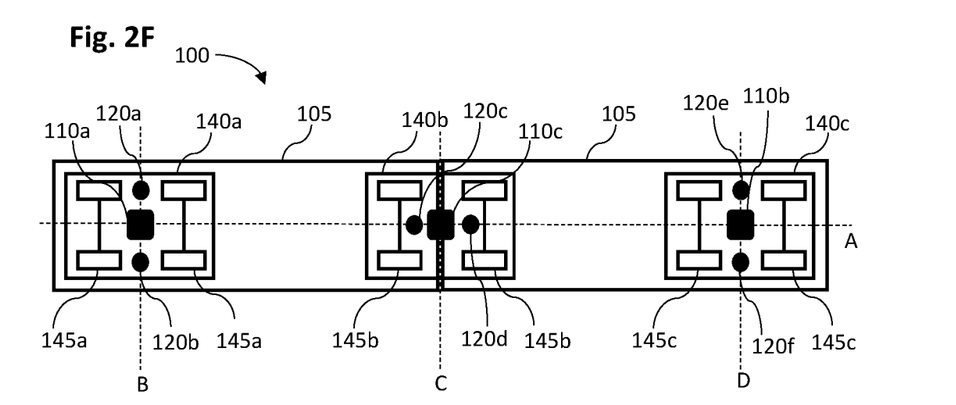

FIG. 2F schematically illustrates a system 100 similar to the one showed in FIGS. 2D and 2E, wherein two railway vehicles 105 comprises three bogies 140b, 140b and 140c, and wherein the bogie 140b is arranged between the two individual railway vehicles 105. Each bogie 140a, 140b, 140c comprises two set of wheels 145a, 145b and 145c respectively. In FIG. 2F, the system 100 comprises two detectors 120a and 120b, and a first emitter 110a are arranged on the first bogie 140a. Detectors 120a and 120b are arranged along a center line B passing through the center of the first bogie 140a and extending in the width direction of the railway vehicle 105, and on opposite sides of a center line A extending in the length/longitudinal direction of the railway vehicle 105. The system 100 further comprises detectors 120c and 120d, and a second emitter 110 are arranged on the second bogie 140b. Detectors 120c and 120d are arranged along the center line A, and on opposite sides of a center line C extending in the width direction of the railway vehicle 105 and passing through the center of the second bogie 140b. The system 100 further comprises detectors 120e and 120f, and a third emitter 110 are arranged on the bogie 140c. Detectors 120e and 120f are arranged along a center line D passing through the center of the third bogie 140c and extending in the width direction of the railway vehicle 105, and on opposite sides of the center line A. In FIG. 2F, a total of six detectors 120 are used, and thus the weight status may be generated based on six respective distance data sets. It is to be understood that more detectors and emitters could be arranged at other positions on the railway vehicles 105 or bogies 140. Furthermore, it is to be understood that in FIG. 2F, the detectors 120 may be replaced by a respective radar unit 112, arranged in the same way, in which case the emitters 110a, 110b and 110c would not be present. Instead, each radar unit 112 would comprise an emitter 110 and a detector 120.

Figure 2G:
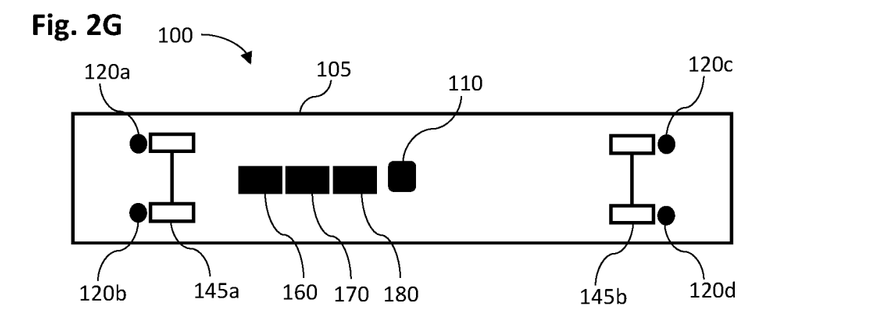

FIG. 2G schematically illustrates an embodiment similar to FIG. 2A-2F, wherein the system 100 comprises two set of wheels. The system 100 further comprises an accelerometer 160 and a gyroscope 170 arranged on the railway vehicle 105. It is to be understood that the system may comprise an accelerometer 160 and/or a gyroscope 170. The accelerometer 160 and gyroscope is configured to generate a directional data set. The weight status of the railway vehicle 105 may also be based on the generated directional data set. The system 100 further comprises a temperature sensor 180, wherein the temperature sensor 180 is configured to generate a temperature data set. The temperature data set may comprise an ambient temperature data set. In other words, the temperature sensor 180 may be configured to generate an ambient temperature data set, indicating an ambient temperature, e.g. of the surrounding air. The weight status may also be based on the generated temperature data set. The accelerometer 160 and the gyroscope 170, and the temperature sensor 180 may be used in combination as shown in FIG. 2G, and thus the weight status may be also based on the directional data set and the temperature data set in combination. Alternatively, the system 100 comprises the accelerometer 160 and the gyroscope 170, or the accelerometer 180 separately and the weight status is thus based partly on the directional data set or the temperature data set respectively.

The accelerometer 160, gyroscope 170 and temperature sensor 180 may be arranged on the underside of the railway vehicle 105, as illustrated in FIG. 2G. Alternatively, the accelerometer 160 and gyroscope 170 may be arranged on another location of the railway vehicle 105, such as inside the railway vehicle 105, or on the roof of the railway vehicle 105. The temperature sensor 180 may be arranged on a location on the outside of the railway vehicle 105 such that it is able to measure an ambient temperature. The system may comprise more than one temperature sensor 180. In this case, more than one temperature data set may be used to help determine the weights status of the railway vehicle 105.

Figure 3:
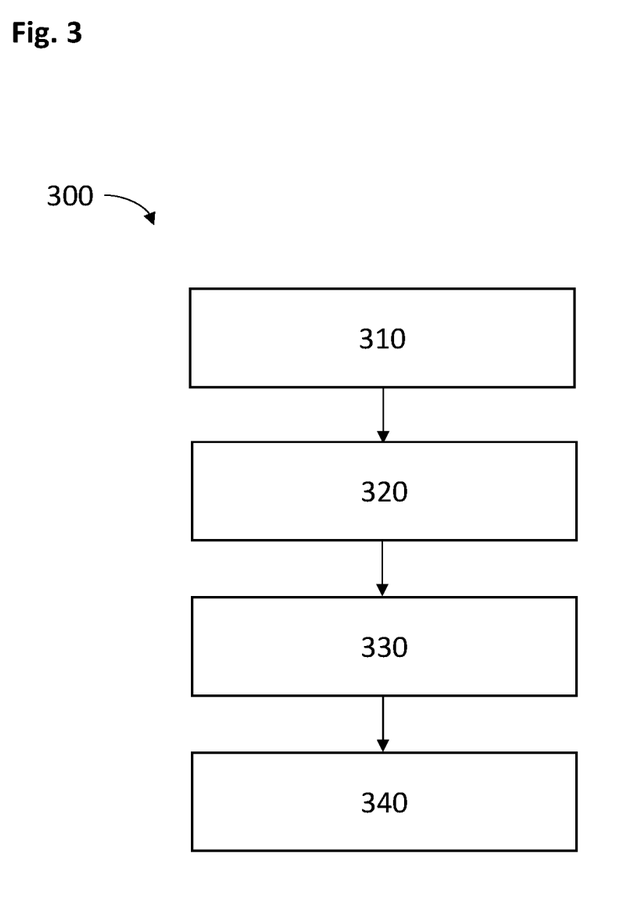
FIG. 3 schematically shows a method in accordance with an embodiment of the present invention.

FIG. 3 schematically shows a method 300 for determining a weight status of a railway vehicle. The method 300 comprises emitting 310 radio waves the rails of a railway. The radio waves may be emitted by at least one emitter configured to emit radio waves. A portion of the emitted radio waves will be reflected by the rails.

The method further comprises detecting 320 at least a portion of reflected radio waves by a first, second, third and fourth detector. The four detectors are arranged at a respective first, second, third and fourth position on the railway vehicle.

The method 300 further comprises generating 330 a first, second, third and fourth distance data set for each respective detector. The distance data set is based on the detected reflected radio waves. If more than four detectors are used, one distance data set is generated for each of the detectors.

The method 300 further comprises determining a weight status based on at least the first, second, third and fourth distance data set by a processing unit.

Figure 4:
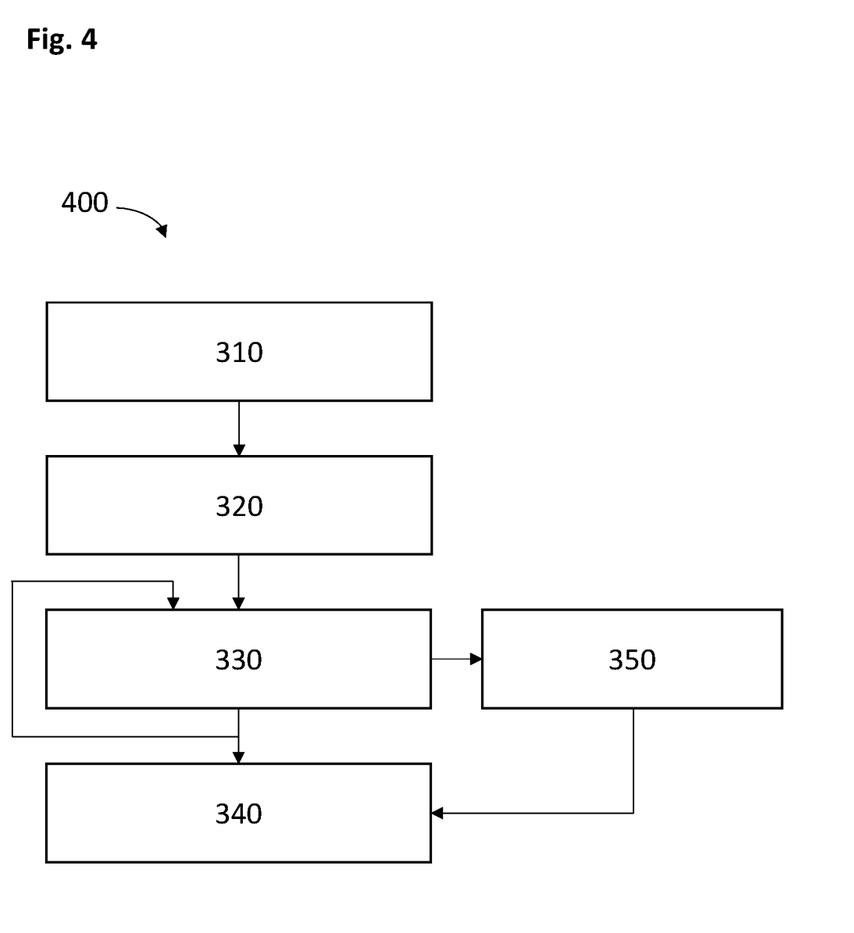
FIG. 4 schematically shows a method in accordance with an embodiment of the present invention.

FIG. 4 schematically shows a method 400 in accordance with an embodiment of the present invention. It should be noted that the method 400 shown in FIG. 4 has several features in common with the method 300 discussed in FIG. 3, and it is hereby referred to FIG. 3 and the associated text for an increased understanding of some of the features and/or steps of the method 400. In FIG. 4, the method comprises generating 330 a plurality of first, second, third and fourth distance data sets during operation of the railway vehicle at different times. For example, a first set of the first, second, third and fourth distance sets may be generated at a first time, and a second set of the first, second, third and fourth distance sets may be generated at a second time. If more than four detectors are used, the first set of distance data sets may comprise more than four distance data sets. Each respective detector generates a respective distance data set. The method further comprises determining 350 a friction metric based on the plurality of distance data sets acquired at different times. The different times, e.g. the first and second time, may be directly succeeding each other, or be detected and generated with a larger time span in between. The friction metric may then be used in determining 340 the weight status of the railway vehicle. The friction metric relates to the force of the suspension unit of a bogie of the railway vehicle, and may change over time as the suspension unit is worn out. Utilizing this in determining the weight status may provide for a more accurate weight approximation of the railway vehicle. The friction metric may be determined at one point and be used when determining the weight status from that point on. Generating a distance data set 330 may be repeated more than two times, and all generated distance data set may then be used in determining the friction metric 350.

Figure 5A:
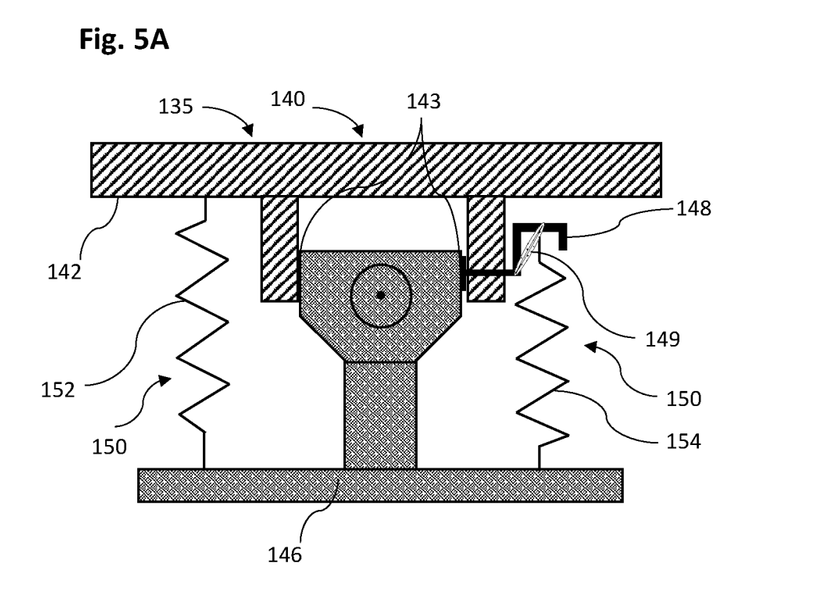
FIG. 5A schematically shows a running gear of a railway vehicle.

FIG. 5A schematically shows an exemplary running gear 135 of a railway vehicle 105. It is hereby referred to FIG. 1A-B, FIG. 2A-G and FIG. 3-4, and the associated texts for an increased understanding of some of the features when reading the text for FIG. 5A.

The railway vehicle 105 comprises a bogie 140 comprising a bogie frame 142, an axle box 146 and a suspension unit 150. The suspension unit 150 comprises a first spring 152 and a second spring 154. The first 152 and second spring 154 comprise a respective spring constant, $F_1$ and $F_2$. The first spring 152 provides suspension directly between the axle box 146 and the bogie frame 142. The running gear 135 comprises a spring holder 148 and a Lenoir link 149. The second spring 154 provides suspension between the axle box 146 and the bogie frame 142 via the spring holder 148. In FIG. 5A the running gear 135 comprises friction surfaces 143 between the bogie frame 142 and the axle box 146. The friction at the friction surfaces 143 may affect the displacement of the railway vehicle 105 relative the rails/railroad/ground.

The suspension unit 150 provides a displacement between the railway vehicle 105 and the rails when the railway vehicle 105 is loaded with e.g. cargo and/or passengers. The present invention provides a way of measuring this displacement by using radio waves to measure the distance between the railway vehicle 105 and the rails/railroad/ground, thus allowing a weight status to be determined based on the measured distances/displacement. The present invention allows the weight status to be at least partly determined based on a suspension metric of the suspension unit 150 and/or a friction metric indicating a friction e.g. at the friction surfaces 143. The suspension metric may be related to the spring constant, $F_1$, of the first 152 and/or the spring constant, $F_2$, of the second spring 154. The suspension metric may be related to an ambient temperature, which may affect the suspension of the suspension unit 150, e.g. spring constants $F_1$ and $F_2$. The processing unit 130 of the system 100 of the present invention may be configured to determine the weight status of the railway vehicle 105 at least partly based on the suspension metric and/or the friction metric.

Figure 5B:
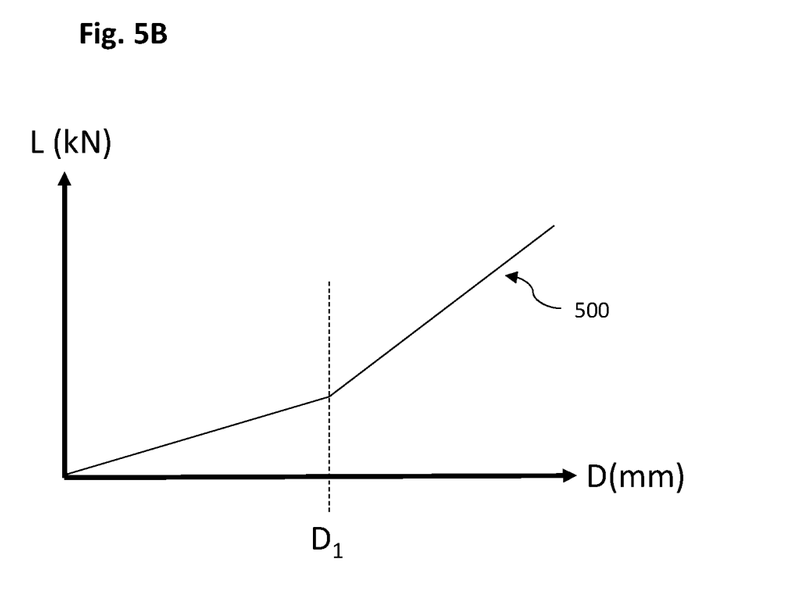
FIG. 5B schematically shows a suspension chart, disclosing a relationship between the suspension-displacement and a load.

FIG. 5B schematically discloses a suspension chart, showing the relationship between the suspension-displacement, D, (x-axis, mm) and a load, L, (y-axis, kN). The graph 500 shows the relation between the displacement, in millimeter, via the suspension and a load, in kilonewton. In FIG. 5B it can be seen how the displacement vs load relationship is different before a certain displacement $D_1$, and after the displacement $D_1$. The weight status of a railway vehicle may be based on a suspension metric, wherein the suspension metric comprises a suspension chart and/or suspension chart data, indicating the relationship between load and suspension-displacement of a suspension unit. In other words, the suspension metric may comprise suspension chart data, indicating how much displacement will follow/occur for a certain weight/weight status.

The person skilled in the art realizes that the present invention by no means is limited to the preferred embodiments described above. On the contrary, many modifications and variations are possible within the scope of the appended claims. For example, one or more of the at least one emitter 110, first, second third and fourth detector 120 may have different shapes, dimensions and/or sizes than those depicted/described. The system may comprise more emitters and detectors. Furthermore, the arrangement of the different components of the system 100 may be different than those depicted/described.

The invention claimed is:

1. A system for determining a weight status of a railway vehicle, the system comprising:
   at least one emitter configured to emit radio waves,
   a first detector arranged on the railway vehicle, configured to detect radio waves and generate a first distance data set,
   a second detector arranged on the railway vehicle, configured to detect radio waves and generate a second distance data set, a third detector arranged on the railway vehicle, configured to detect radio waves and generate a third distance data set, a fourth detector arranged on the railway vehicle, configured to detect radio waves and generate a fourth distance data set, wherein the first, second, third and fourth distance data set indicate a displacement of the railway vehicle relative at least one of the rails, the railroad and the ground, and wherein the first, second, third and fourth detector are arranged at different locations on the railway vehicle, wherein the railway vehicle comprises
- a first bogje comprising a first set of wheels, wherein the first detector is arranged on the first bogie at a first position, and the second detector is arranged on the first bogie at a second position different from the first position, and
- a second bogie comprising a second set of wheels, wherein the third detector is arranged on the second bogie at a third position, and the fourth detector is arranged on the second bogie at a fourth position different from the third position, and
- a processing unit configured to receive the first, second, third and fourth distance data set, and determine a weight status of the railway vehicle based at least on the first, second, third and fourth distance data set.

2. The system according to claim 1, wherein the system comprises a first emitter, a second emitter, a third emitter and a fourth emitter, wherein the first, second, third and fourth emitter are arranged adjacent the first, second, third and fourth detector respectively.

3. The system according to claim 2, wherein the first emitter and the first detector forms a first radar unit, wherein the second emitter and the second detector forms a second radar unit, wherein the third emitter and the third detector forms a third radar unit and wherein the fourth emitter and the fourth detector forms a fourth radar unit.

4. The system according to claim 1, wherein the railway vehicle comprises:
- a first suspension unit for the first bogie, and
- a second suspension unit for the second bogle,
wherein the first, second, third and fourth detector are arranged on a suspended part of the railway vehicle, and wherein the processing unit is configured to determine the weight status at least partially based on a suspension-displacement.

5. The system according to claim 4, wherein the processing unit is configured to determine the weight status also based on at least one suspension metric of the first and/or second suspension.

6. The system according to claim 1, wherein:
the first and second detector are arranged on opposite sides of the first bogle and along the center line extending in the width or longitudinal direction of the first bogie, and
the third and fourth detector are arranged on opposite sides of the second bogie and along the center line extending in the width or longitudinal direction of the second bogie.

7. The system according to claim 1, wherein the weight status comprises an approximated weight of the railway vehicle.

8. The system according to claim 1, wherein the weight status comprises a weight distribution in a horizontal plane of the railway vehicle, wherein the first, second, third and fourth detector are arranged in said horizontal plane.

9. The system according to claim 1, wherein the railway vehicle comprises:
a fifth, sixth, seventh and eight detectors, wherein the fifth and sixth detector are arranged on opposite sides of the first bogie and along a center line extending in the longitudinal direction of the first bogie, and wherein the seventh and eight detectors are arranged on opposite sides of the second bogie and along a center line extending in the longitudinal direction of the second bogie.

10. The system according to claim 1, wherein the system comprises at least one of an accelerometer and a gyroscope configured to generate a directional data set, and wherein the weight status is also based on the directional data set.

11. The system according to claim 1, wherein the system comprises a temperature sensor configured to generate a temperature data set, and wherein the weight status is also based on the temperature data set.

12. The system according to claim 1, wherein the weight status may be determined by using machine learning methods.

13. A method for determining a weight status of a railway vehicle, the method comprises:
emitting radio waves by at least one emitter,
detecting at least a portion of reflected radio waves by a first, second, third and fourth detector arranged at a respective first, second, third and fourth position on the railway vehicle, wherein the railway vehicle comprises a first bogie comprising a first set of wheels, wherein the first detector is arranged on the first bogie at a first position, and the second detector is arranged on the first bogie at a second position different from the first position, and a second bogie comprising a second set of wheels, wherein the third detector is arranged on the second bogle at a third position, and the fourth detector is arranged on the second bogie at a fourth position different from the third position,
generating a first, second, third and fourth distance data set for each respective detector, wherein the first, second, third and fourth distance data set indicate a displacement of the railway vehicle relative at least one of the rails, the railroad and the ground, and
determining a weight status based on at least the first, second, third and fourth distance data set by a processing unit.

14. The method according to claim 13, wherein the method further comprises determining a friction metric by generating a first set of the first, second, third and fourth distance data set during operation of the railway vehicle at a first time, and a second set of the first, second, third and fourth distance data set during operation of the railway vehicle at a second time different from the first time, and subsequently determine the friction metric based on the first and second set, wherein the determining of the weight status is also based on the friction metric.

* * * * *